(12) United States Patent
Kim et al.

(10) Patent No.: US 11,609,332 B2
(45) Date of Patent: Mar. 21, 2023

(54) METHOD AND APPARATUS FOR GENERATING IMAGE USING LIDAR

(71) Applicant: RESEARCH COOPERATION FOUNDATION OF YEUNGNAM UNIVERSITY, Gyeongsan-si (KR)

(72) Inventors: Hyun Koo Kim, Gyeongsan-si (KR); Ho Youl Jung, Gyeongsan-si (KR); Kook Yeol Yoo, Gyeongsan-si (KR); Ju Hyun Park, Gyeongsan-si (KR)

(73) Assignee: RESEARCH COOPERATION FOUNDATION OF YEUNGNAM UNIVERSITY, Gyeongsan-si (KR)

( * ) Notice: Subject to any disclaimer, the term of this patent is extended or adjusted under 35 U.S.C. 154(b) by 1074 days.

(21) Appl. No.: 16/324,956

(22) PCT Filed: Jan. 2, 2019

(86) PCT No.: PCT/KR2019/000017
§ 371 (c)(1),
(2) Date: Feb. 12, 2019

(87) PCT Pub. No.: WO2020/045767
PCT Pub. Date: Mar. 5, 2020

(65) Prior Publication Data
US 2021/0333400 A1 Oct. 28, 2021

(30) Foreign Application Priority Data
Aug. 27, 2018 (KR) ........................ 10-2018-0100639

(51) Int. Cl.
*G06K 9/00* (2022.01)
*G01S 17/89* (2020.01)
(Continued)

(52) U.S. Cl.
CPC ............ *G01S 17/89* (2013.01); *G01S 7/4808* (2013.01); *G01S 17/931* (2020.01); *G06T 7/00* (2013.01);
(Continued)

(58) Field of Classification Search
CPC ...... G01S 17/89; G01S 7/4808; G01S 17/931; G01S 17/894; G06T 7/00; G06T 9/00;
(Continued)

(56) References Cited

U.S. PATENT DOCUMENTS 8,675,181 B2 3/2014 Hall
9,369,689 B1 6/2016 Tran et al.
(Continued)

FOREIGN PATENT DOCUMENTS

EP 3340106 A1 6/2018
JP 2018515825 A 6/2018
(Continued)

*Primary Examiner* — Duy M Dang
(74) *Attorney, Agent, or Firm* — Harness, Dickey & Pierce, P.L.C.

(57) ABSTRACT

According to an aspect of embodiments, a method of generating an image by using LiDAR includes performing a reconstruction of a two-dimensional reflection intensity image, the performing of the reconstruction including projecting three-dimensional reflection intensity data that are measured by using the LiDAR as the two-dimensional reflection intensity image, and the method includes generating a color image by applying a projected two-dimensional reflection intensity image to a Fully Convolutional Network (FCN).

12 Claims, 3 Drawing Sheets

(51) Int. Cl.
*G01S 17/931* (2020.01)
*G01S 7/48* (2006.01)
*G06T 7/00* (2017.01)
*G06T 9/00* (2006.01)
*H04N 13/15* (2018.01)

(52) U.S. Cl.
CPC ...... *G06T 9/00* (2013.01); *G06T 2207/10028* (2013.01); *G06T 2207/20084* (2013.01); *H04N 13/15* (2018.05)

(58) Field of Classification Search
CPC . G06T 2207/10028; G06T 2207/20081; G06T 2207/20084; G06N 20/00; G06N 3/04; G06N 3/08; H04N 13/15
See application file for complete search history.

(56) References Cited

U.S. PATENT DOCUMENTS

| | | | |
|---|---|---|---|
| 9,872,010 B2 | 1/2018 | Tran et al. | |
| 9,877,009 B2 | 1/2018 | Tran et al. | |
| 2018/0322640 A1* | 11/2018 | Kim | G08G 5/04 |
| 2019/0035113 A1* | 1/2019 | Salvi | G06T 9/002 |

FOREIGN PATENT DOCUMENTS

| | | |
|---|---|---|
| KR | 10-1097182 | 12/2011 |
| KR | 20170113251 A | 10/2017 |

* cited by examiner (a)　　　　　　(b)　　　　　　(c)

METHOD AND APPARATUS FOR GENERATING IMAGE USING LIDAR

CROSS-REFERENCE TO RELATED APPLICATIONS

This application is a U.S. National Phase Application under 35 U.S.C. 371 of International Application No. PCT/KR2019/000017, filed on Jan. 2, 2019, which claims the benefit of Korean Patent Application No. 10-2018-0100639, filed on Aug. 27, 2018. The entire disclosures of the above applications are incorporated herein by reference.

TECHNICAL FIELD

The present disclosure in some embodiments relates to a method and apparatus for generating an image using LiDAR.

BACKGROUND

The statements in this section merely provide background information related to the present disclosure and do not necessarily constitute prior art.

Light Detection And Ranging (hereinafter, LiDAR) is used to measure the distance to an object and obtain information reflected from the object. With LiDAR, the distance to the object is measured by using the time taken to radiate light to an object and receive the light back, as well as the amount of reflected light. Cameras used for imaging an object would produce unclear images due to their optical sensitivity to the influence of light or shadows, where LiDAR unaffected by light can provide constant performance data regardless of the weather and illumination. For example, at nighttime imaging with a camera would produce an image with hardly discernible objects or shapes, whereas LiDAR generates visually detectable and discernible data of objects even at nighttime.

The LiDAR has been used to construct 3D Geographic Information System (GIS) information, and information measured by using LiDAR has been visualized by advanced technologies for applications in construction, aviation, defense and other fields. More recent technologies are under development for applying LiDAR to autonomous vehicles and mobile robots.

However, reflection intensity obtained using LiDAR is sparse, making it difficult to identify or detect objects. This prompts LiDAR to involve cameras, when used to identify or detect objects.

DISCLOSURE

Technical Problem

The present disclosure in some embodiments seeks to provide a method and an apparatus for generating an image using LiDAR.

Technical Problem

According to an aspect of embodiments, a method of generating an image by using LiDAR includes performing a reconstruction of a two-dimensional reflection intensity image, the performing of the reconstruction including projecting three-dimensional reflection intensity data that are measured by using the LiDAR as the two-dimensional reflection intensity image, and the method includes generating a color image by applying a projected two-dimensional reflection intensity image to a deep learning network.

According to an aspect of embodiments, an apparatus for generating an image by using LiDAR includes a LiDAR projection image generation unit configured to reconstruct a two-dimensional reflection intensity image by projecting three-dimensional reflection intensity data that are measured by using the LiDAR as the two-dimensional reflection intensity image, and an image generation unit using a deep learning network configured to generate a color image by applying a projected two-dimensional reflection intensity image to a deep learning network.

SUMMARY

At least one aspect of the present disclosure provides a method of generating an image by using LiDAR, the method including performing a reconstruction of a two-dimensional reflection intensity image, the performing of the reconstruction including projecting three-dimensional reflection intensity data that are measured by using the LiDAR as the two-dimensional reflection intensity image, and the method including generating a color image by applying a projected two-dimensional reflection intensity image to a deep learning network.

Another aspect of the present disclosure provides an apparatus for generating an image by using LiDAR, which includes a LiDAR projection image generation unit and an image generation unit. The LiDAR projection image generation unit is configured to reconstruct a two-dimensional reflection intensity image by projecting three-dimensional reflection intensity data that are measured by using the LiDAR as the two-dimensional reflection intensity image. The image generation unit is configured to use a deep learning network for generating a color image by applying a projected two-dimensional reflection intensity image to the deep learning network.

Advantageous Effects

As described above, according to at least one embodiment, images as brilliant as daylight can be obtained night and day, and as clear as the sun regardless of whether it's sunny or not. Applied to an autonomous vehicle in some embodiments, the present disclosure generates images less affected by the surrounding environment than when using a camera. Applied to crime prevention in some embodiments, the present disclosure provides clear images even at night or on a cloudy day.

DETAILED DESCRIPTION

Figure 1:
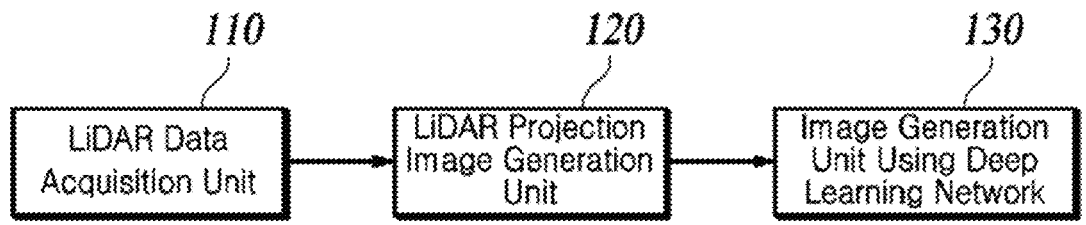
FIG. 1 is a block diagram of a configuration of an apparatus for generating an image using LiDAR according to at least one embodiment of the present disclosure.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary. The terms such as "unit," "module," and the like refer to units for processing at least one function or operation, which may be implemented by hardware, software, or a combination of the two.

FIG. 1 is a block diagram of a configuration of an apparatus for generating an image using LiDAR according to at least one embodiment of the present disclosure.

The apparatus for generating an image using the LiDAR according to some embodiments of the present disclosure includes a LiDAR data acquisition unit 110, a LiDAR projection image generation unit 120, and an image generation unit 130 using a deep learning network.

The FIG. 1 illustrates a plurality of divided components, which may be integrated into a single configuration, or a single component may be divided into several component units.

Figure 2:
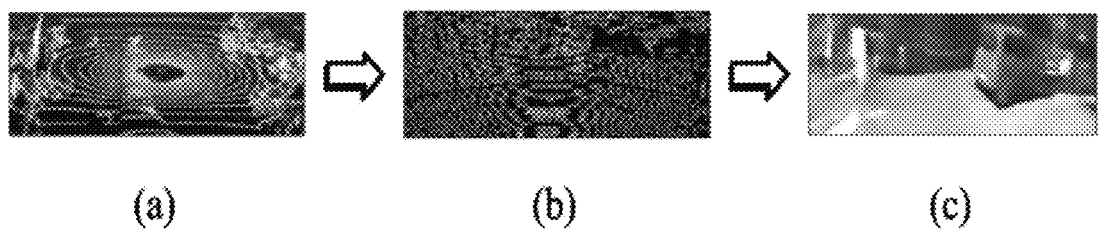
FIG. 2 is a diagram sequentially showing an image generated according to at least one embodiment of the present disclosure.

The LiDAR data acquisition unit 110 utilizes LiDAR for measuring the distance to the object and the amount of reflectance or reflection intensity of light reflected from the object. Random presence or absence of objects and the distance thereto will generate LiDAR data that is not only generally inconstant, but also short of being dense. FIG. 2 shows at (a) an example visualization of data obtained by the LiDAR data acquisition unit 110.

The LiDAR projection image generation unit 120 projects, in two-dimensional coordinates, the reflection intensity data having three-dimensional coordinates obtained by the LiDAR data acquisition unit 110. The reflection intensity data with the three-dimensional coordinates may have the form of a point cloud. At this time, the viewing angle, resolution, tilt angle, and height of the image to be projected may be considered. A projection matrix may be used to project three-dimensional coordinates into two-dimensional coordinates. For example, Equation 1 as in the following shows a mathematical expression for transforming three-dimensional coordinates into two-dimensional coordinates by using a projection matrix. Here, X, Y and Z represent three-dimensional coordinates to be converted, and u and v represent transformed two-dimensional coordinates.

$$s \begin{bmatrix} u \\ v \\ 1 \end{bmatrix} = \begin{pmatrix} f_u & 0 & c_u \\ 0 & f_v & c_v \\ 0 & 0 & 1 \end{pmatrix} \begin{pmatrix} 1 & 0 & 0 & 0 \\ 0 & 1 & 0 & 0 \\ 0 & 0 & 1 & 0 \end{pmatrix} \begin{pmatrix} R_L^C & t_L^C \\ 0 & 1 \end{pmatrix} \begin{bmatrix} X \\ Y \\ Z \\ 1 \end{bmatrix} \quad \text{Equation 1}$$

In addition, s is the scale factor, $c_u$ and $c_v$ are the principal point of the camera, $f_u$ and $f_v$ are the focal length, $R_L^C \in R^{3 \times 3}$ and $t_L^C \in R^{1 \times 3}$ denote a rotation matrix and a transformation matrix, respectively, for transforming LiDAR into a camera position. FIG. 2 shows at (b) an example projection, in two-dimensional coordinates, of the reflection intensity data having three-dimensional coordinates, obtained by the LiDAR data acquisition unit 110.

The image generation unit 130 using the deep learning network generates the image by applying the data generated from the LiDAR projection image generation unit 120, that is, the reflection intensity data projected in two-dimensional coordinates, to the trained deep learning network. The image generated using the deep learning network may be a monochrome or color image. The image generation unit 130 using the deep learning network will be described in detail below.

In order to facilitate the understanding of the present disclosure, each of the components included in the image generating apparatus (FIG. 1) using the LiDAR according to some embodiments is divided into functional components, which in practice may be implemented as a single component such as a CPU, MPU, GPU or ECU. Alternatively, those components may be implemented through multiple devices. In particular, the image generation unit 130 using the deep learning network of the FIG. 1 may be implemented using a GPU. Specifically, although other processors may realize color image generation, the GPU is a good choice for processing thereof at a higher speed. Accordingly, the LiDAR projection image generation unit 120 and the image generation unit 130 using the deep learning network may be integrated with the LiDAR data acquisition unit 110.

Figure 3:
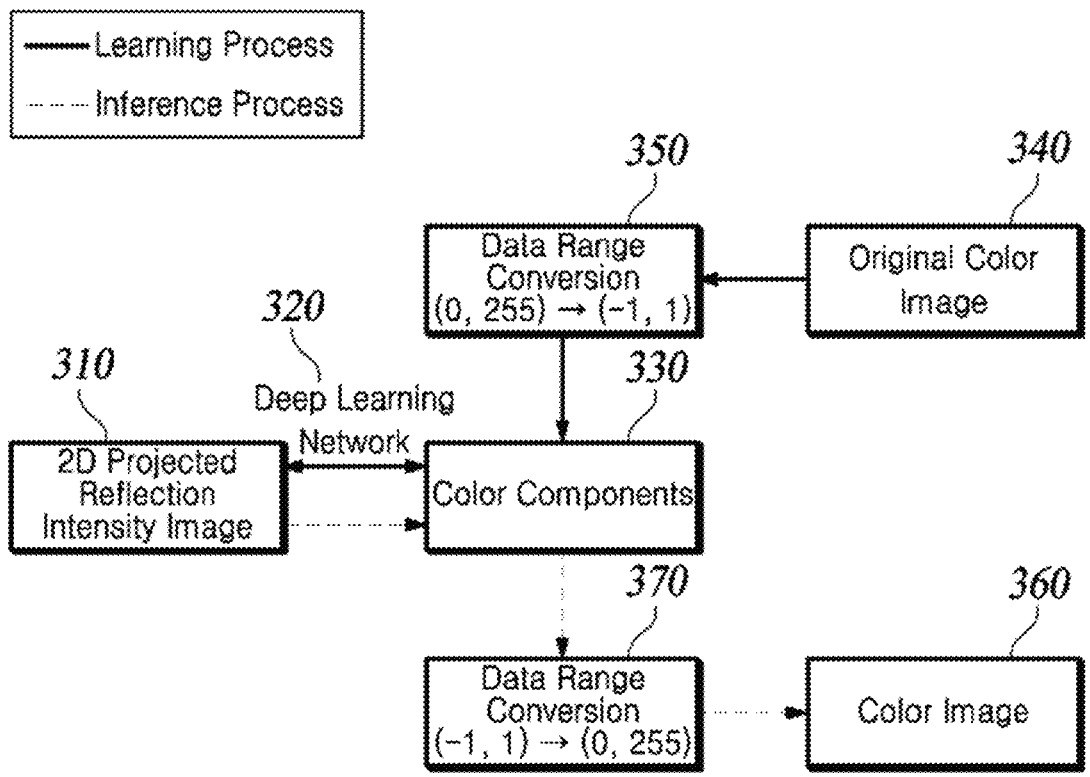
FIG. 3 is a diagram of learning and reasoning processes performed by an image generation unit using a deep learning network according to at least one embodiment of the present disclosure.

FIG. 3 is a diagram of learning and reasoning processes performed by an image generation unit using a deep learning network according to at least one embodiment of the present disclosure.

Specifically, FIG. 3 is a diagram showing learning and reasoning processes for generating a color image.

First, in the learning process, a reflection intensity image 310 projected in two-dimensional coordinates generated by the LiDAR projection image generation unit 120 is input to a deep learning network 320 which then outputs color components 330. Selectively, three dimensional coordinates (or distance to an object) may be input to the deep learning network 320 as well. The coefficients of deep learning network 320 are trained so that color components 330 output from the deep learning network 320 coincide with the color components of an original color image 340. The original color image 340 used in the learning process may be an image captured by a camera. In addition, the original color image 340 may be an image whose shadow has been deleted from the image captured by the camera. In the present disclosure, learning is performed using shadowless images because LiDAR, unaffected by shadows or light, can provide the same good data as daytime offers, even in an environment where shadows occur or even at night. In other words, the reflection intensity (or reflectance, reflectivity) information does not show the characteristics of a shadow, so the learning is performed using the shadowless image. If learning involved shaded images, color components could be distorted by shadows. In addition, obtaining shadowless images is a technology of significance for autonomous driving algorithms for machines such as moving robots and automobiles, and various studies thereof are under way.

When the deep learning network 320 utilizes the tanh function as an activation function, the output value has a value between −1 and 1. This causes a discrepancy that the color components extracted from the original color image 340 have an effective range that do not coincide with that of the color components 330 output from the deep learning network 320, which needs a data range conversion 350 of the color components extracted from the original color image 340. Alternatively, the color components 330 output from the deep learning network 320 need a conversion to be within the valid range of the color components extracted from the original color image 340. The following description illustrates the case of converting the range of the color components extracted from the original color image 340. Color components may be represented by R, G, and B, and in general, their range of values is between 0 and 255 in an image. The color components are not necessarily converted to RGB, and they may be converted into various color components such as Gray, YUV, YCbYr and CIE Lab. However, since the color components 330 output by the deep learning network 320 has a value between −1 and 1 by the activation function, the data range conversion 350 is performed on the original color image 340 to have the range of color components between −1 and 1. In other words, the range of data to be converted varies in accordance with the active function of the deep learning network.

In the following reasoning process, the reflection intensity image projection in the two-dimensional coordinates, which is generated by the LiDAR projection image generation unit 120 is input to the deep learning network 320, to output the color components 330. As in the learning process, three-dimensional coordinates (or distances to objects) may also be selectively input to the deep learning network 320. The color components 330 output, having a value between −1 and 1, from the deep learning network 320 undergo a data range conversion 370 to have a value between 0 and 255. The converted value is used to generate a color image 360.

Figure 4:
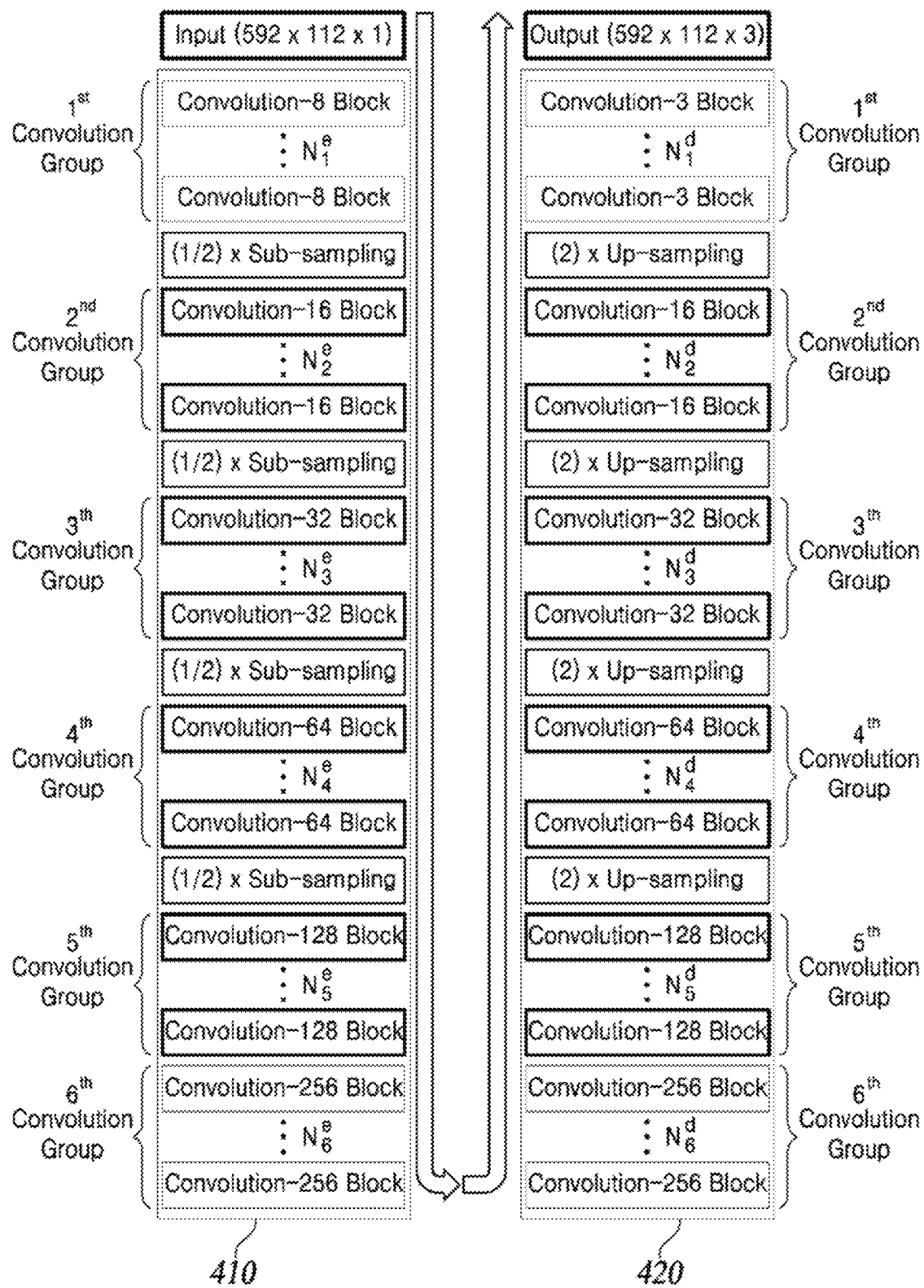
FIG. 4 is a diagram of a structure of a deep learning network according to at least one embodiment of the present disclosure.

FIG. 4 is a diagram of a structure of a deep learning network according to at least one embodiment of the present disclosure.

Specifically, FIG. 4 illustrates an image of 592×112 size as an example. Therefore, changes in image size will result in changes in the number of convolution groups or the number of sampling times.

The input to the deep learning network may be a reflection intensity image projected in two dimensional coordinates. In this case, the input of the reflection intensity alone constitutes one channel, and an additional input of three-dimensional coordinates (or the distance to the object) makes up two channels. The output of the deep learning network may be three channels of R, G, B representing the components of the color image.

The deep learning network according to some embodiments may be composed of an encoding unit 410 and a decoding unit 420. The encoding unit unit 410 and the decoding unit 420 of the deep learning network may be an asymmetrically configured Fully Convolutional Network (FCN).

The encoding unit 410 may include at least one convolution group and a sub-sampling unit. The decoding unit 420 may also include at least one convolution group and an up-sampling unit. The convolution group may be composed of at least one convolution block. The convolution block (convolution-K block) may be composed of a convolution layer including K 3×3 filters, a batch normalization layer, and an active function, in the above order. In addition, the convolution layer may be set to have a stride of 1 and padding to be even, and the last convolution block of the decoding unit 420 may use tanh as an active function. The active function of all other convolution blocks may be Rectified Linear Unit (ReLU) (see Equation 2).

$$\tanh(x) = 2\left(\frac{1}{1+e^{-2x}}\right) - 1,$$

$$\mathrm{Re}LU(x) = \max(0, x)$$

Equation 2

As shown in FIG. 4, the number of iterations of the convolution block constituting the i-th convolution group of the encoding unit 410 is $N_i^e$, and the number of iterations of the convolution block constituting the j-th convolution group of the decoding unit 420 is $N_j^d$, wherein the numbers of repetitions are variable.

The encoding unit 410 and the decoding unit 420 of the FCN may have an asymmetric structure by configuring the convolution blocks constituting the convolution group of the encoding unit 410 to have the total number of $\Sigma_i^6 N_i^e$, and the convolution blocks constituting the convolution group of the decoding unit 420 to have the total number of $\Sigma_j^6 N_j^d$ so that $\Sigma_i^6 N_j^d < \Sigma_j^6 N_j^d$, i.e., the total number of convolution blocks of the decoding unit 420 is larger than that of the convolution blocks of the encoding unit 420.

The number of subsampling times of the encoding unit 410 may be a factor of 2 to which max-pooling may be applied. The number of up-sampling times of the decoding unit 420 may be a factor of 2 to which un-pooling may be applied.

Figure 5:
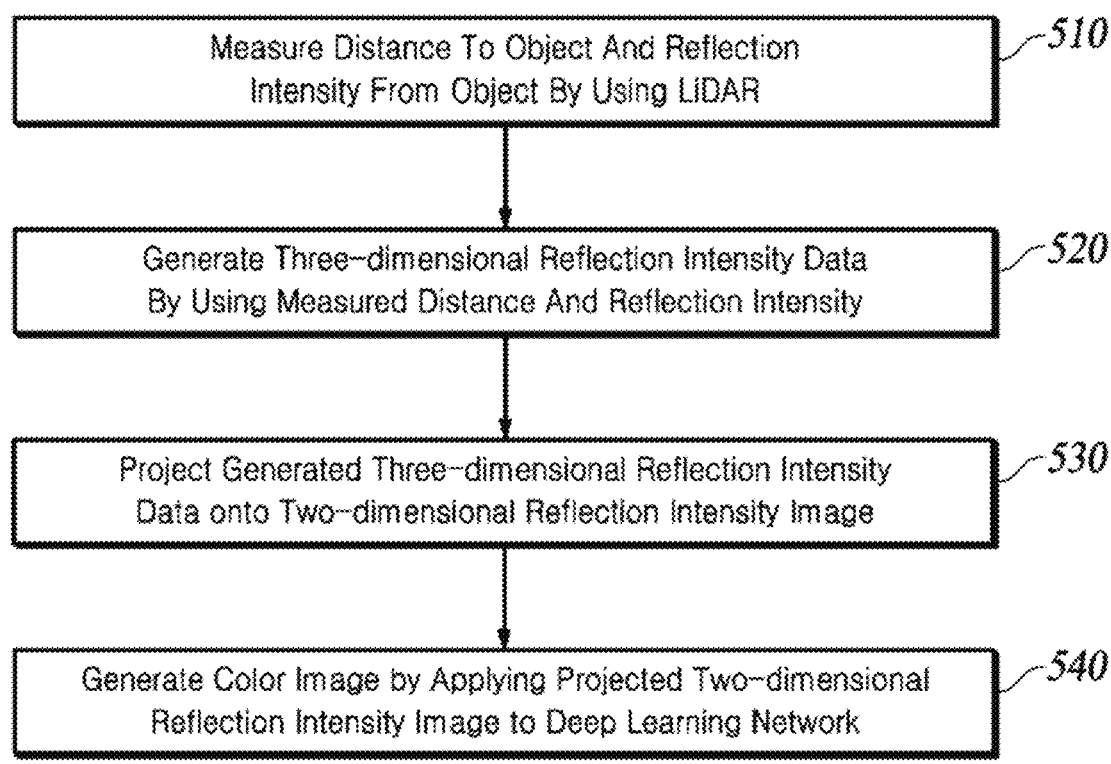
FIG. 5 is a flowchart of a method of generating an image using LiDAR in accordance with at least one embodiment of the present disclosure.

FIG. 5 is a flowchart of a method of generating an image using LiDAR in accordance with at least one embodiment of the present disclosure.

The distance to the object and the reflection intensity are measured by using LiDAR (in Step 510). For example, the distances to the object may be expressed in three-dimensional coordinates by measuring distances on the X, Y, and Z coordinates, respectively.

Three-dimensional reflection intensity data are generated by using the distance and reflection intensity that are measured (520).

The generated three-dimensional reflection intensity data is projected as a two-dimensional reflection intensity image (530). For example, the generated three-dimensional reflection intensity data may be converted into a two-dimensional reflection intensity image by using a projection matrix.

The projected two-dimensional reflection intensity image is applied to a deep learning network to generate a monochrome or color image (540). The deep learning network may be an FCN. At this time, in addition to the projected two-dimensional reflection intensity image, the measured distance or three-dimensional coordinates may be further input to the FCN. The FCN may be composed of an encoding unit and a decoding unit, and the encoding unit and the decoding unit may be configured asymmetrically. The FCN may be trained by using a shadowless image as an original image.

Although the steps 510 to 540 in FIG. 5 are described to be sequentially performed, they merely instantiate the technical idea of some embodiments of the present disclosure. Therefore, a person having ordinary skill in the pertinent art could appreciate that various modifications, additions, and substitutions are possible by changing the sequences described in the respective drawings or by performing two or more of the steps in parallel, without departing from the gist and the nature of the embodiments of the present disclosure, and hence the steps 510 to 540 in FIG. 5 are not limited to the illustrated chronological sequences.

The steps shown in FIG. 5 can be implemented as computer-readable codes on a computer-readable recording medium. The computer-readable recording medium includes any type of recording device on which data that can be read by a computer system are recordable. Examples of the computer-readable recording medium are a magnetic recording medium (e.g., a ROM, a floppy disk, a hard disk, etc.), an optically readable medium (e.g., a CD-ROM, a DVD, etc.), and the like, and a carrier wave (e.g., transmission through the Internet). Further, the computer-readable recording medium can be distributed in computer systems connected via a network, wherein computer-readable codes can be stored and executed in a distributed mode.

The invention claimed is:

1. A method of generating a color image from LiDAR data, the method comprising:
    generating a two-dimensional reflection intensity image by projecting three-dimensional reflection intensity data, that is measured by a LiDAR device, into two-dimensional coordinates corresponding to a coordinate system of a camera; and
    generating a color image by applying the two-dimensional reflection intensity image to a deep learning network,
    wherein coefficients of the deep learning network are trained based on a comparison between a first color image generated by the deep learning network and a second color image captured by the camera,
    wherein the deep learning network comprises an encoder configured to receive the two-dimensional reflection intensity image and a decoder configured to generate color components for each pixel from an output of the encoder, and
    wherein the generating a color image includes:
        inputting the two-dimensional reflection intensity image to the encoder; and
        converting color components of each pixel generated by the decoder into an expression range of color components of the color image, the color components of each pixel having a range limited by an activation function used in the decoder.

2. The method of claim 1, wherein the deep learning network is a Fully Convolutional Network (FCN).

3. The method of claim 1, wherein the encoder unit and the decoder unit are configured asymmetrically with respect to each other.

4. The method of claim 1, wherein the second color image is a shadowless image.

5. The method of claim 1, wherein an input of the encoder comprises a first channel for receiving the two-dimensional reflection intensity image and a second channel for receiving a measured distance to an object.

6. The method of claim 1, wherein the color components of each pixel generated by the decoder are represented by values between 0 and 1, or between −1 and 1, and
    wherein the color components of the color image are represented by a valuovalues between 0 and 255.

7. An apparatus for generating a color image from LiDAR data, the apparatus comprising:
    a LiDAR projection image generation unit configured to generate a two-dimensional reflection intensity image by projecting three-dimensional reflection intensity data, that is measured by a LiDAR device, into two-dimensional coordinates corresponding to a coordinate system of a camera; and
    an image generation unit configured to generate a color image by applying the two-dimensional reflection intensity image to a deep learning network,
    wherein coefficients of the deep learning network are trained based on a comparison between a first color image generated by the deep learning network and a second color image captured by the camera, and
    wherein the deep learning network comprises an encoder configured to receive the two-dimensional reflection intensity image and a decoder configured to generate color components for each pixel from an output of the encoder,
    wherein the image generation unit is further configured to:
        input the two-dimensional reflection intensity image to the encoder; and
        convert color components of each pixel generated by the decoder into an expression range of color components of the color image, the color components of each pixel having a range limited by an activation function used in the decoder.

8. The apparatus of claim 7, wherein the deep learning network is a Fully Convolutional Network (FCN).

9. The apparatus of claim 8, wherein the color components of each pixel generated by the decoder are represented by values between 0 and 1, or between −1 and 1, and
    wherein the color components of the color image are represented by values between 0 and 255.

10. The apparatus of claim 7, wherein the encoder unit and the decoder unit are configured asymmetrically with respect to each other.

11. The apparatus of claim 7, wherein the second color image is a shadowless image.

12. The apparatus of claim 7, wherein an input of the encoder comprises a first channel for receiving the two-dimensional reflection intensity image and a second channel for receiving a measured distance to an object.

\* \* \* \* \*